US 6,556,573 B1

(12) United States Patent
Kaaresoja

(10) Patent No.: US 6,556,573 B1
(45) Date of Patent: Apr. 29, 2003

(54) SYNCHRONIZATION OF ATM-BASED NETWORK SYSTEM USING VARIABLE BIT RATE ATM ADAPTATION LAYER PROTOCOLS

(75) Inventor: Topi Johannes Kaaresoja, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/092,540

(22) Filed: Jun. 5, 1998

(51) Int. Cl.[7] ............................. H04L 12/56; H04J 3/06
(52) U.S. Cl. ............................ 370/395.64; 370/503
(58) Field of Search ............................. 370/395, 516, 370/503, 509, 510, 512, 395.1, 395.6, 395.61, 395.62, 395.64, 395.65; 375/354, 355, 362, 368, 370–372, 376

(56) References Cited

U.S. PATENT DOCUMENTS

| 5,260,978 | A |   | 11/1993 | Fleischer et al. |         |
|-----------|---|---|---------|------------------|---------|
| 5,694,397 | A |   | 12/1997 | Burton           |         |
| 5,896,388 | A |   | 4/1999  | Earnest          |         |
| 6,049,543 | A | * | 4/2000  | Sauer            | 370/395 |
| 6,108,336 | A | * | 8/2000  | Duault           | 370/395 |
| 6,195,353 | B1 | * | 2/2001 | Westberg         | 370/395 |

FOREIGN PATENT DOCUMENTS

| EP | 0 757 503 A2 | 2/1997  |
| EP | 0 868 042 A2 | 9/1998  |
| EP | 0 876 017 A1 | 11/1998 |
| EP | 0 915 587 A2 | 5/1999  |

OTHER PUBLICATIONS

Kim, Three Level traffic shaper and its application to source clock frequency recovery for VBR video services an ATM network; Aug. 1995; IEEE; pp. 450–458.*

Series I: Integrated Services Digital Network, Overall network aspects and functions—Protocol layer requirements, International Telecommunication Union, ITU–T Recommendation 1.363.1; 47 pages. (Aug. 1996).

Series I: Integrated Services Digital Network, Overall network aspects and functions—Protocol layer requirments, International Telecommunication Union, ITU–T Recommendation 1.363.5; 48 pages. (Aug. 1996).

Series I: Integrated Services Digital Network, Overall network aspects and functions—Protocol layer requirements, International Telecommunication Union, ITU–T Recommendation 1.363.2; 48 pages. (Sep. 1997).

* cited by examiner

*Primary Examiner*—Steven Nguyen
(74) *Attorney, Agent, or Firm*—Altera Law. Group LLC

(57) ABSTRACT

A system and method for synchronizing variable bit rate traffic between a source and destination in an Asynchronous Transfer Mode (ATM) network. The method includes designating a variable bit rate ATM Adaptation Layer (AAL) protocol to define ATM cell traffic flow from the source to the destination. A synchronous residual timestamp (SRTS) value indicative of the timing of a source clocking function is encoded and transmitted with an ATM cell using a variable bit rate AAL, such as AAL2 or AAL5. The ATM cells and associated SRTS values are received and decoded at the destination ATM interface, and the destination clock is synchronized with the source clock by modifying the destination clock according to the SRTS values.

15 Claims, 8 Drawing Sheets

SYNCHRONIZATION OF ATM-BASED NETWORK SYSTEM USING VARIABLE BIT RATE ATM ADAPTATION LAYER PROTOCOLS

FIELD OF THE INVENTION

The present invention relates generally to network communications systems, and more particularly, to a system and method for providing clock synchronization of source and destination clocking functions, for ATM variable bit rate traffic operating under the AAL2 and AAL5 layered protocols.

BACKGROUND OF THE INVENTION

The modern communications era has brought about a tremendous proliferation of wireline and wireless networks. Computer networks, television networks, and telephony networks in particular are experiencing an unprecedented technological expansion, fueled by consumer demand. The ever-increasing need for transportation, due in part to the expansion of the world-wide market and the popularity of suburbia, has led to an increased use of automobiles and airplanes for business and pleasure. The desire to maintain the ability to communicate, even while away from the home or office, has driven the wireless communication market to a large extent. One response to this demand was the mobile/wireless telephone network.

The demand by consumers all over the world for mobile communications is expanding at a rapid pace and will continue to do so for at least the next decade. Over 100 million people were using a mobile service by the end of 1995, and that number is expected to grow to 300 million by the year 2000. Several factors are contributing to the exciting growth in the telecommunications industry. For example, a combination of technology and competition bring more value to consumers. Phones are smaller, lighter, have a longer battery life, and are affordable now for the mass market. Operators are providing excellent voice quality, innovative services, and roaming across the country or world. Most important, mobility is becoming less expensive for people to use. Around the world, as well as in the United States, governments are licensing additional spectrum for new operators to compete with traditional cellular operators. Competition brings innovation, new services, and lower prices for consumers.

Cellular telephone communications systems allow users of cellular telephones to be connected to other cellular telephone users, as well as being connected to the conventional landline Public Switched Telephone Network (PSTN). Cellular telephones work by dividing geographical areas into "cells". Each cell includes a base station, which typically contains a transceiver, antenna, and dedicated lines to a Mobile Telephone Switching Office (MTSO) or Mobile Switching Center (MSC). Adjacent cells utilize different radio frequencies in order to prevent interference between the adjacent cells.

Many standards exist for public mobile systems. One such standard is the Global System for Mobile communications (GSM), which is accepted in Europe and several countries outside Europe as the international standard for modern public mobile systems. GSM is an open system that can be used for both voice and data, and uses digital transmission for voice and signaling. GSM systems also use time-division multiplexing (TDM) that can offer many channels on one frequency.

A variety of data transmission technologies can be used in connection with mobile communications. One transmission technology currently being explored in connection with the present invention is asynchronous transfer mode (ATM) technology as it is used in connection with voice and data transmission in mobile system architectures such as GSM. ATM is a cell-based switching and multiplexing technology designed to be a general-purpose, connection-oriented transfer mode for a wide range of services.

ATM is a transfer mode that uses information "cells" as the means of transferring information. The cell has a fixed length of 53 octets, which includes a 5-octet header and a 48-octet payload. The header includes a Virtual Path Identifier (VPI) and Virtual Channel Identifier (VCI) which identify the cell destination. A transmission path contains one or more virtual paths (VP), while each virtual path may contain one or more virtual channels (VC). The VPI together with the VCI identify the virtual circuit by which ATM switches route the call from source to destination. Other fields in the cell header include the Generic Flow Control (GFC) which allows a multiplexer to control the rate of an ATM terminal, and the Payload Type (PT) field that indicates whether the cell contains user data, signaling data, or maintenance information. The Cell Loss Priority (CLP) bit in the cell header indicates the priority of the cell relative to other cells, and the Header Error Check (HEC) field detects and corrects errors in the header.

In a communication system such as a Base Station System (BSS), a need to interface dissimilar technologies may arise. For example, a cellular network incorporating ATM technology may at some point require interfacing to a public switched telephone network (PSTN) or mobile switching center (MSC) that implements pulse code modulation (PCM). PCM refers to the traditional digital modulation method that encodes a voice signal into an eight-bit word representing the amplitude of each pulse. More specifically, the speech signal is sampled at 8 khz, and each sample is encoded using an 8-bit code to provide 8,000 samplings at 8 bits per sample, resulting in a 64-Kbps bit stream. Because of the dissimilarity between ATM and PCM information transfer technologies, conversion and synchronization may be required.

For example, an ATM-based BSS is designed to work in a cellular environment having an arrangement of cells, each cell having a base transceiver station (BTS) (also referred to as a base station or BS). Cells when grouped together form a cluster, and the MSC is connected to all of the base stations in a cluster. Alternatively, a base station controller (BSC), which is a modular switching platform, can perform the connection and traffic concentration between a number of BTSs and the MSC. A BSC also controls the basic functionality of those BTSs connected to it. Each BTS manages radio traffic with multiple mobile stations (MS). In sum, the BSS is a system of BTSs and BSCs which is viewed by the MSC through a single interface.

In such an ATM-based BSS, a transcoder (TC) is an inter-working function (IWF) between the ATM and the PCM environments. An IWF allows interoperation between a native protocol and an ATM-based end device. The PCM environment can be a PSTN or a MSC depending on the phase of the ATM-based GSM network evolution. A TC is a network element which provides the conversion between GSM-coded voice signals and the standard PCM 64-Kbit/sec signal used in the MSC and PSTN.

However, the interface between an ATM-based BSS and the PCM-based MSC (or PSTN) can bring about some synchronization concerns. The principal concern can be described as follows. The transmitting clock of the BTS operates at the frequency $f_{BTS}$, and the receiving clock of the TC operates at the frequency $f_{TC}$. Because the transmission is asynchronous, the TC will not know the exact frequency of the BTS transmitter. If $f_{BTS}$ is slightly higher than $f_{TC}$ and no discontinuous transmission (DTX) is used in the ATM, the receiving buffers of the TC may eventually overflow. Audible "clicks" will occur on the telephone connected to the PCM when a TRAU frame is discarded because of the overflow in the buffer. This holds true for communications in the opposite direction as well.

In order to avoid this overflow condition, the PCM interface of the IWF should be synchronized with the PCM component of the BTS. In many cases, the BTS will have some PCM-oriented components in order to synchronize with mobile stations, as well as an ATM interface.

Synchronization has been accomplished in various manners. If the ATM switches can support propagating a physically transmitted clock from the PSTN to the BTS, such as by way of plesiochronous digital hierarchy (PDH) or synchronous digital hierarchy (SDH) frames, synchronization can be accomplished.

Where the ATM switches do not support such physical clock propagation, other methods must be used. For example, the clock frequency can be "deduced" in the BTS in some fashion. Some methods of deducing the sender's clock frequency include investigation of the mean arrival rate of incoming ATM cells, and the investigation of the level of the buffer for the incoming ATM cells.

Investigation of the mean arrival rate of incoming cells involves the source sending cells at time $t_A$ where the destination knows the cell should arrive at time $t_B$. The time difference $t_{B-A}$ is then used to adjust the clock. In ATM networks, the cell delay variation (CDV) can be diminished with the use of the median of the arrival time of a predetermined number of cells; for example ten cells. This method may be applicable in ATM-based GSM systems where one-to-one mapping is used.

Another investigation technique used to deduce the clock frequency in the BTS is to measure the size of the buffer for incoming cells. The object of this method is to keep the size of the incoming cell buffer at some relatively constant level C. If the buffer begins to fill, the clock frequency is increased until the cell buffer migrates back towards the level C. Similarly, if the buffer begins to empty, the clock frequency is decreased until the cell buffer migrates up towards the level C.

In another method, the synchronous residual timestamp (SRTS) used in connection with AAL1 can be used to deduce the clock frequency in the BTS. Before discussing this method, an understanding of the ATM Adaptation layers (AAL) is required.

ATM networks require the use of communication protocols, as is true in any network. A protocol is a formal set of conventions governing the formatting and relative timing of message exchange between two communication systems. For one computer to communicate with another, each must be capable of understanding the other's protocol. In the computer and communications arena, protocols are defined through protocol architectures, and are modeled in a layered fashion with lower layer protocols providing services to the next higher layer. The protocols between terminal and network are referred to as lower layer protocols, while network protocols are used for the creation of the connection from switch to switch within the network itself.

Higher layer protocols are protocols between two terminals, and the information is passed transparently by the network from one terminal to the other. The reference model for Open Systems Interconnection (OSI) is a standard of the International Organization for Standardization (ISO), and is perhaps the most generic protocol architecture.

The OSI reference model consists of a seven-layer model. Described generally, the physical layer is the lowest layer and provides access to the transmission medium and includes rules for the transmission of bits between source and destination. The next layer, the data link layer, is concerned with the transmission of frames of data between devices, and provides error detection/correction, multiplexing, and flow control. The network layer protocols provide end-to-end addressing and flow control. This layer accepts messages from higher layers, separates them into packets, routes them to the destination through the physical and data link layers, and reassembles them in the same form in which the source delivered them. The higher layers include the transport, session, presentation, and application layers. The transport layer provides multiplexing onto the network layer while the session layer establishes a connection between end systems. The presentation layer manipulates data into different forms for the highest layer, the application layer.

A layered protocol architecture directed to ATM technology has evolved from the OSI reference model. The ATM model is commonly referred to as the B-ISDN/ATM (broadband integrated services digital network) protocol reference model. This model comprises a physical layer (PHY layer) that corresponds to the OSI reference model layer 1, and an ATM level and ATM Adaptation Layer (AAL). The ATM level in connection with part of the AAL corresponds to OSI reference model layer 2 (data link layer). The ATM layer defines virtual paths and virtual channels, performs multiplexing, switching, and control actions based upon information in the ATM cell header, and passes cells to, and accepts cells from, the ATM Adaptation Layer (AAL). The AAL passes Protocol Data units (PDUs) to, and accepts PDUs from, higher layers. PDUs may be of variable length, or may be of fixed length different from the ATM cell length.

The physical layer includes two sublayers, referred to as the physical medium (PM) sublayer and the transmission convergence (TC) sublayer. The PM sublayer provides for the actual clocking of bit transmission over the physical medium. The TC sublayer converts between the bit stream clocked to the physical medium and ATM cells. The TC maps transmitted cells into the Time Division Multiplexing (TDM) frame format, and delineates individual received cells. The TC also generates the HEC on transmit for use in correcting and detecting errors, and performs cell rate decoupling by sending idle cells when the ATM layer has not provided a cell.

The ATM layer constructs the ATM virtual paths (VPs) and Virtual Channels (VCs) according to the VPI and VCI respectively in the cell header. The ATM layer also performs a variety of other functions, including cell construction, header validation, cell multiplexing and demultiplexing, and generic flow control.

The AAL is divided into the Convergence Sublayer (CS) and the Segmentation And Reassembly (SAR) sublayer. The CS sublayer is further subdivided into Service Specific (SS) and Common Part (CP) components. While the SSCS sublayer is optionally implemented, the CPCS must always be implemented along with the SAR sublayer. Generally, AAL layers 1–4 are defined to map to four different service classes defining timing relations, constant versus variable bit rates, and whether the connection mode is connection-oriented or connectionless.

As previously described, a synchronous residual timestamp (SRTS) has been in connection with AAL1 for synchronization purposes. AAL1 uses one octet of every cell payload to support unstructured circuit transport. A timing recovery functionality within AAL1 is necessary to maintain the bit timing across the ATM network and to avoid buffer overflow/underflow at the receiver. The SRTS concept is based on the source and destination having a very accurate frequency clock of frequency $f_n$ that represents the network clock frequency. The SRTS is a four-bit field in the AAL1-PDU (Protocol Data Unit) that establishes the residual portion between the source and network clocks. The signal has a service clock frequency $f_x$ with the objective being to pass sufficient information via the AAL1 so that the destination can reproduce this clock frequency with high accuracy. The network reference clock $f_n$ is divided by x such that $1 \leq f_{nx}/f_s \leq 2$. The source clock is divided by N to sample the 4-bit counter $C_t$ driven by the network clock $f_{nx}$ once every predetermined number of bits generated by the source (e.g., every 8th ATM cell, or every 47*8*8=3008 bits). This sampled counter output is transmitted as the SRTS in the SAR PDU.

However, while there is a network clock available in the ATM network, the SRTS method described above does not account for the fact that the clock of the voice circuits of the BSS is not connected to the clock of the ATM network. AAL1 is not suitable for transmitting packet-oriented compressed voice data, as it is used exclusively for constant bit rate (CBR) traffic. The SRTS in AAL1 can not exploit the benefits of the Voice Activity Detection (VAD) function, i.e., variable bit rate (VBR) traffic. Therefore, it would be desirable to provide for the transmission of packet-oriented compressed voice data, such as ATM voice data, in a variable bit rate fashion while providing for synchronization between the source and destination. The present invention provides a solution to this and other shortcomings of the prior art, and offers other advantages over the prior art.

SUMMARY OF THE INVENTION

The present invention is directed to a system and method for transmitting, via ATM technology, synchronous timestamp information using ATM adaptation layers 2 (AAL2) and 5 (AAL5) between at least two ATM interfaces.

In accordance with one embodiment of the invention, a method is provided for synchronizing variable bit rate traffic between a source and destination in an Asynchronous Transfer Mode (ATM) network. The method includes designating a variable bit rate ATM Adaptation Layer (AAL) protocol to define ATM cell traffic flow from the source to the destination. A synchronous residual timestamp (SRTS) value indicative of the timing of a source clocking function is encoded and transmitted with an ATM cell using a variable bit rate AAL, such as AAL2 or AAL5. The ATM cells and associated SRTS values are received and decoded at the destination ATM interface, and the destination clock is synchronized with the source clock by modifying the destination clock according to the SRTS values.

In accordance with a more specific embodiment of the invention, an AAL5 protocol is designated to define the ATM cell traffic flow from the source to the destination. Transmission of the SRTS values with the ATM cells includes creating an SRTS field in an AAL5 Common Part Convergence Sublayer Protocol Data Unit (CPCS-PDU) trailer to occupy at least a portion of the SRTS value. A sequence number (SN) field in the AAL5 CPCS-PDU trailer is created to occupy a sequence number corresponding to a sequence and completion status of segmented portions of the SRTS value. The CPCS-PDU, including the sequence number and the segmented portion of the SRTS value from the CPCS-PDU trailer, is transmitted using the AAL5 protocol.

In accordance with another specific embodiment of the invention, an AAL5 protocol is designated to define the ATM cell traffic flow from the source to the destination. Transmission of the SRTS values with the ATM cells includes creating an SRTS field in an ATM payload section of the AAL5 Common Part Convergence Sublayer Protocol Data Unit (CPCS-PDU) to occupy at least a portion of the SRTS value. A sequence number (SN) field in the ATM payload section of the AAL5 CPCS-PDU is created to occupy a sequence number corresponding to a sequence-and completion status of segmented portions of the SRTS value. The CPCS-PDU, including the sequence number and the segmented portion of the SRTS value from the ATM payload section, is transmitted using the AAL5 protocol.

In accordance with another specific embodiment of the invention, an AAL2 protocol is designated to define the ATM cell traffic flow from the source to the destination. Transmission of the SRTS values with the ATM cells includes creating an SRTS field in an AAL2 Common Part Sublayer (CPS) packet to occupy at least a portion of the SRTS value. A sequence number (SN) field in the AAL2 CPS packet is utilized to occupy a sequence number corresponding to a sequence and completion status of segmented portions of the SRTS value. The CPS packet, including the sequence number and the segmented portion of the SRTS value from the CPS packet, is transmitted using the AAL2 protocol.

In accordance with another aspect of the invention, a cellular communications system for communicating voice information over a core network using Asynchronous Transfer Mode (ATM) technology and variable bit rates (VBR) is provided. The system includes at least one base transceiver station (BTS) to communicate with at least one mobile station (MS), the BTS having a first ATM interface coupled to the core network. An Inter Working Function (IWF) having a second ATM interface is coupled to the core network to communicate with the first ATM interface in the BTS via the core network. Processing means integral to the BTS and IWF are provided for synchronizing variable bit rate traffic between the first and second ATM interfaces, where the synchronization means includes means for designating a variable bit rate ATM Adaptation Layer (AAL) protocol to define ATM cell traffic flow between the first and second ATM interfaces. The synchronization also includes means for generating a synchronous residual timestamp (SRTS) value indicative of the timing of a source clocking function, and for transmitting the SRTS values with the ATM cells using the variable bit rate AAL. The ATM cells and corresponding SRTS values are received at a destination ATM interface, and the destination clocking function is synchronized to the source clocking function using the SRTS values.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made, without departing from the scope of the invention.

The present invention is directed to a system and method for transmitting, via ATM technology, synchronous timestamp information using ATM adaptation layers 2 (AAL2) and 5 (AAL5). By modifying the AAL protocol structures in accordance with the principals of the present invention, timestamp information (e.g., Synchronous Residual Timestamp) can be conveyed in the network for variable bit rate traffic using AAL2 and AAL5 protocols.

Figure 1:
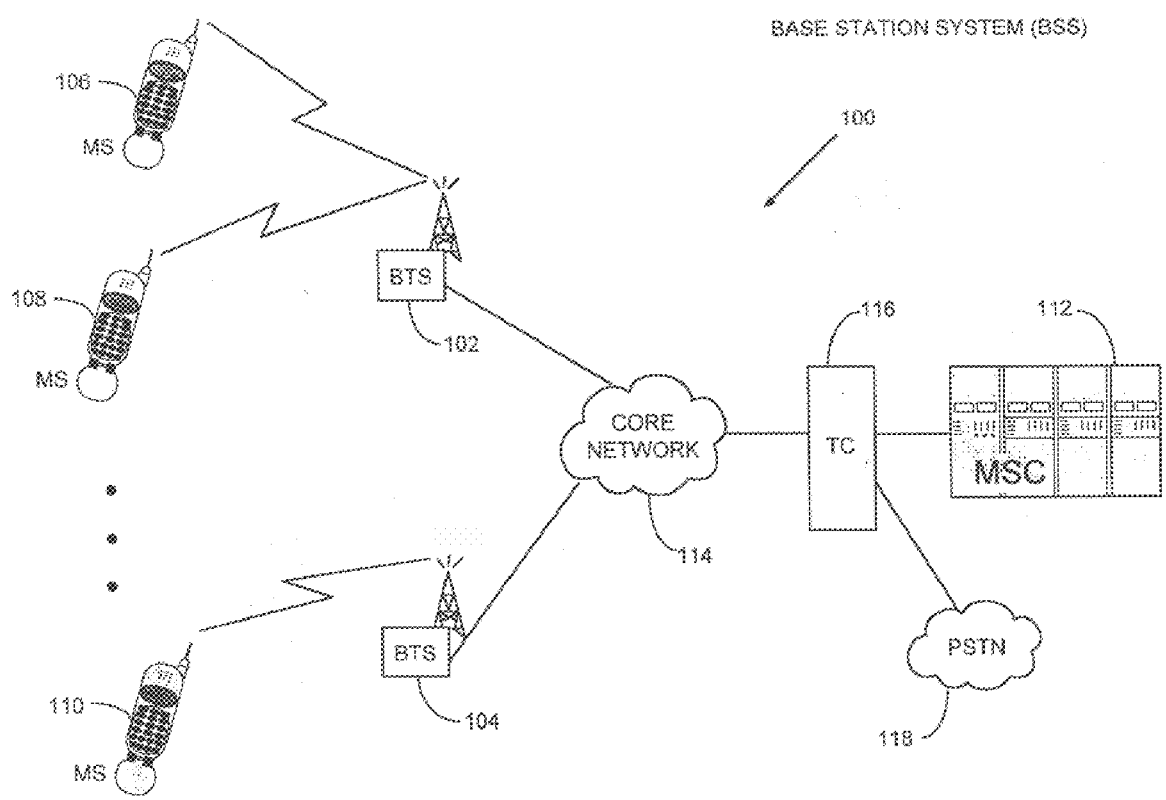
FIG. 1 is a diagram of a mobile/wireless communications network environment in which the principals of the present invention may be employed.

FIG. 1 is a diagram of a mobile/wireless communications network environment in which the principals of the present invention may be employed. The example network environment illustrated in FIG. 1 is representative of the type of network in which the present invention is particularly advantageous, however other networking configurations capable of benefiting from the present invention will become readily apparent to those skilled in the art from the ensuing description. For example, the principals of the present invention may be applied to other audio or video network configurations requiring synchronization of dissimilar information transfer technologies, where variable bit rates are desired for interfacing packet-based and other information transfer technologies. Therefore, while the present invention is particularly advantageous in the network environment illustrated in FIG. 1, and the invention will be described in connection with this exemplary networking environment representing a Global System for Mobile Communication (GSM) infrastructure, the present invention is not limited thereto.

FIG. 1 illustrates an exemplary Base Station System (BSS) 100, which is a system of base stations and associated mobile stations that is viewed by the mobile switching unit through a single interface. The BSS 100 includes one or more Base Transceiver Stations (BTS) 102, 104 that communicate with associated Mobile Stations (MS). MSs 106 and 108 represent two of a potentially large number of mobile stations that can communicate with BTS 102, and MS 110 is capable of communicating with BTS 104.

Each BTS typically serves one "cell" in a cellular network, and includes a transceiver, antenna, and an interface that ultimately reaches the Mobile Switching Center (MSC) 112. The core network 114 interfaces with each BTS in the BSS 100 to route the information between the mobile stations and the MSC 112. The Transcoder (TC) 116 represents an Inter Working Function (IWF) that allows interoperation between a native protocol and an ATM-based device. The TC 116 can also be interfaced with other network environments, such as an Integrated Services Digital Network (ISDN) or the Public Switched Telephone Network (PSTN) 118. The TC 116 is described in further detail in connection with FIG. 2.

The MSC 112 is a mobile network element that manages the interconnection of the cellular network by performing the switching functions in its area of operation. It controls the interworking with other networks such as the external wired telephone network. The MSC 112 also performs tracking functions using database technology to store the location of mobile stations registered in its area, such as through the use of the Home Location Register (HLR) and the Visiting Location Register (VLR).

Figure 2:
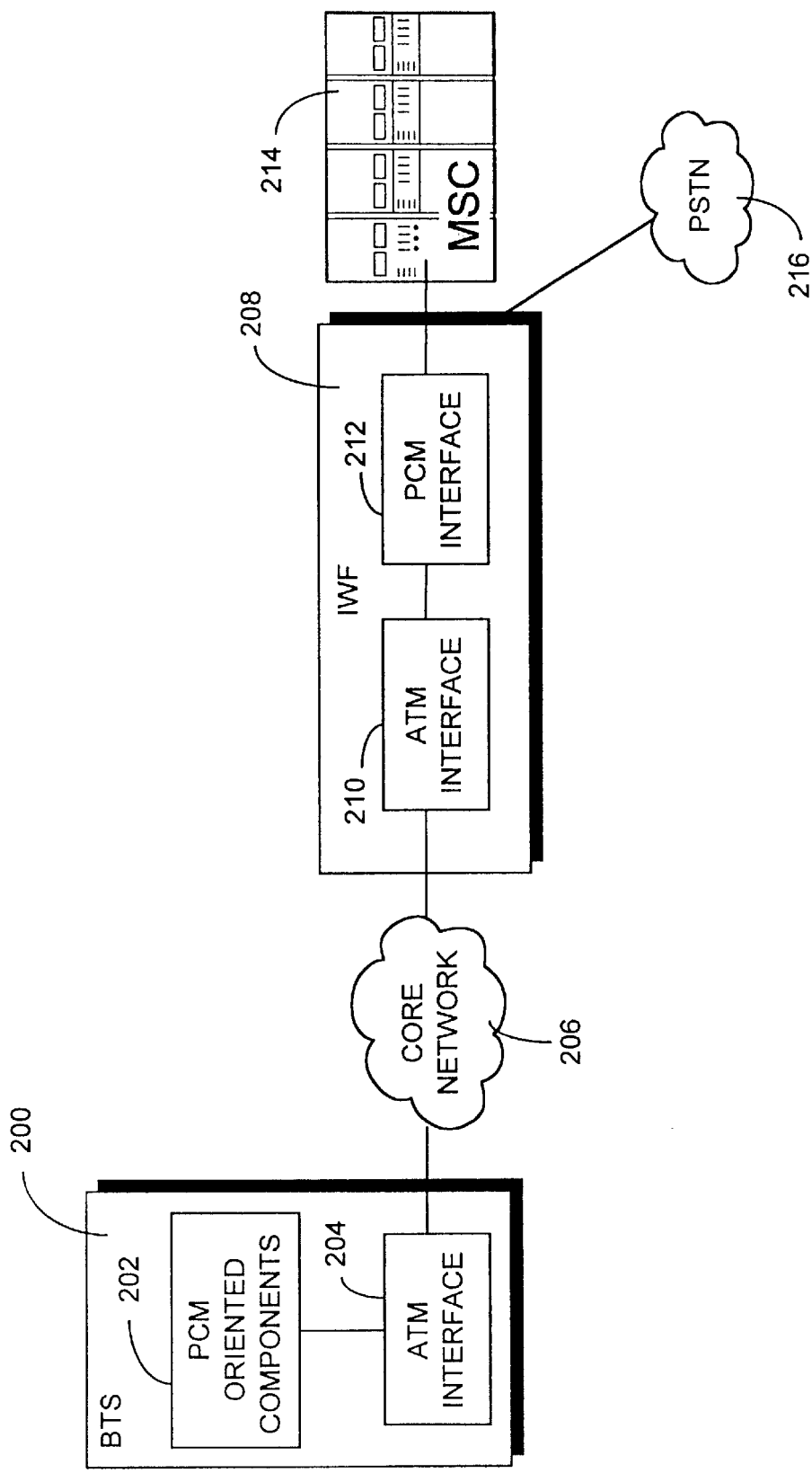
FIG. 2 illustrates a block diagram of the interface between a base transceiver station and an inter working function.

Referring now to FIG. 2, a block diagram of the interface between a base transceiver station and an inter working function is illustrated. The BTS 200 may include components 202 directed to a first modulation technology, such as PCM. Pulse code modulation, or PCM, is an analog-to-digital conversion technique that is used to convert voice for transmission over digital facilities. It is often used with ISDN, and also to convert voice analog data to digital data for transmission in a multiplexed voice and data stream over a T1 or other digital circuit. While in future systems the BTS may not include PCM components, the BTS will still require clock information of the sending module because of the synchronous air interface.

An ATM interface 204 in the BTS 200 interfaces to the core network 206, which in turn interfaces to a transcoder represented by the IWF 208. The IWF 208 also includes an ATM interface 210, and a PCM interface 212 to interface to the MSC 214, the PSTN 216 or other PCM environment.

The transmitting clock of the BTS 200 operates at a first frequency defined as frequency $f_{BTS}$, and the receiving clock of the TC (i.e., IWF) operates at the frequency $f_{TC}$.

Because the transmission is asynchronous, the TC will be unaware of the exact frequency of the BTS transmitter. If $f_{BTS}$ is slightly higher than $f_{TC}$ and no discontinuous transmission (DTX) is used in the ATM, the receiving buffers of the TC may eventually overflow. Audible "clicks" will occur on the telephone connected to the PCM when a TRAU frame is discarded because of the overflow in the buffer.

In order to avoid this condition, the PCM interface 212 of the IWF 208 should be synchronized with the PCM component 202 of the BTS 200. As previously described, synchronization in AAL1 does not account for the fact that the clock of the voice circuits of the BSS is not connected to the clock of the ATM network. AAL1 is not suitable for transmitting packet-oriented compressed voice data, as it is used exclusively for constant bit rate (CBR) traffic. The SRTS in AAL1 can not exploit the benefits of the Voice Activity Detection (VAD) function, i.e., variable bit rate (VBR) traffic. The present invention solves this problem by providing for synchronization through variable bit rate ATM adaptation layers AAL2 and AAL5.

With respect to AAL5, the present invention employs a Synchronous Residual Timestamp (SRTS) method in connection with AAL5 and conveys a residual timestamp and sequence number in the user-to-user field of the Common Part Convergence Sublayer PDU (CPCS-UU). The synchronization mechanism is provided by AAL5 Service Specific Convergence Sublayer (SSCS). Alternatively, the present invention employs an SRTS method in connection with AAL5 by conveying a residual timestamp and sequence number in the payload field, with the actual payload, of the CPCS PDU (CPCS-PDU). The payload in the present example is a speech packet. The synchronization mechanism in this case is provided by the AAL5 user. Currently, AAL5 has no synchronization capabilities, even in definition.

The bit rate of coded GSM speech is 16 Kbit/sec, including overhead, when speech is active. This means that the number of bits transmitted in time t is less than the 64 Kbit/sec of PCM by a factor of four, although the clock rate is the same (i.e., 8 Khz). Where AAL1 provides for the measurement and transmission of an SRTS every eighth ATM cell, this factor of four will result in the transmission of a complete SRTS every other ATM cell for GSM speech.

Figure 3:
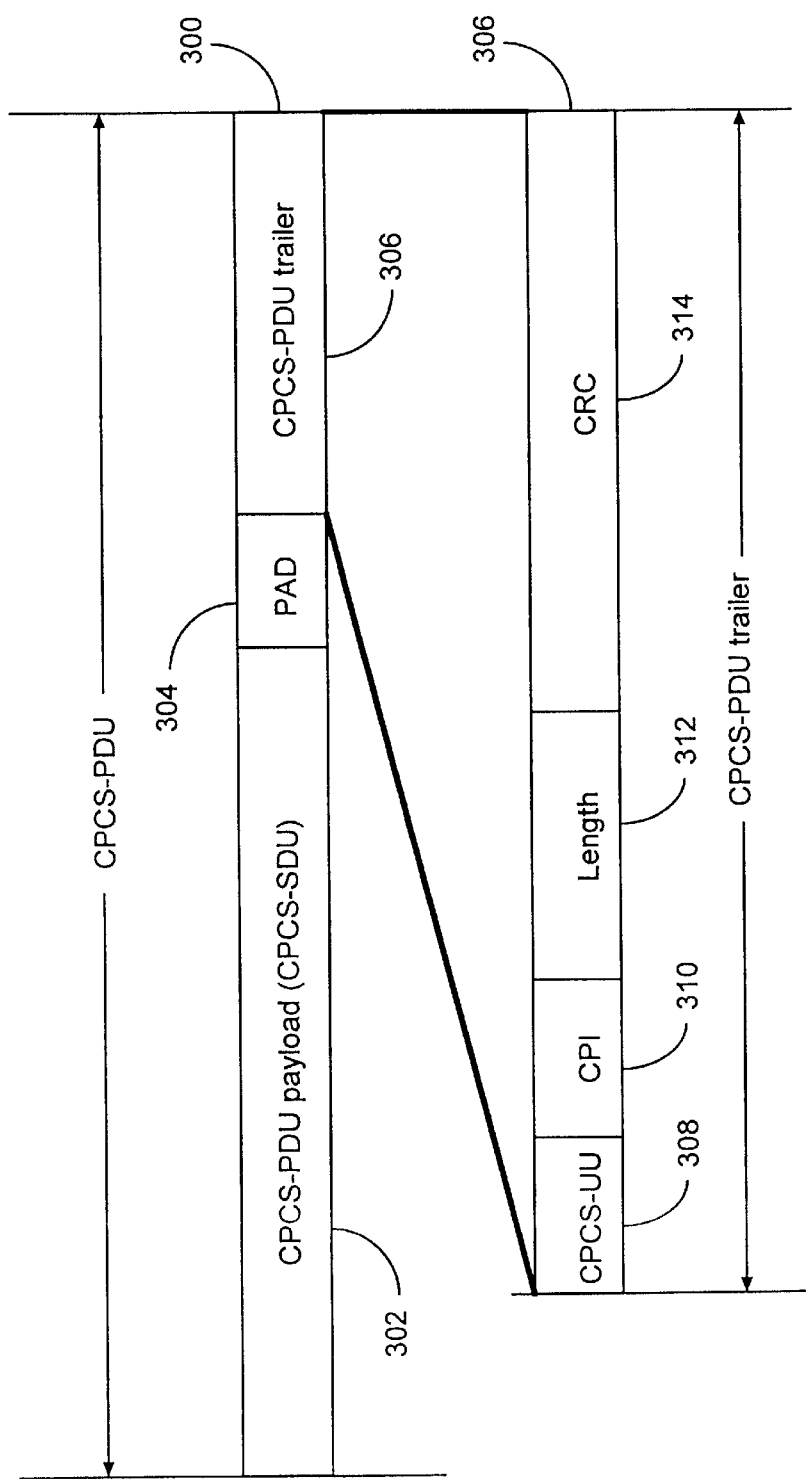
FIG. 3 illustrates an AAL5 CPCS-PDU format.

Referring now to FIG. 3, an AAL5 CPCS-PDU format is illustrated. This format is used in one embodiment of the invention, particularly the inclusion of a residual timestamp in connection with AAL5 to convey the residual timestamp and a sequence number in the user-to-user field of the Common Part Convergence Sublayer PDU (CPCS-PDU).

The Common Part (CP) AAL5 supports Variable Bit Rate (VBR) traffic. The CPCS-PDU 300 includes a CPCS-PDU payload 302, a padding field (PAD) 304, and a CPCS-PDU trailer 306. The CPCS-PDU trailer can be further broken down into the CPCS-UU (Common Part Convergence Sublayer—User-to-User) field 308, the CPI (Common Part Indicator) field 310, the Length field 312, and the CRC (Cyclic Redundancy Check) field 314. The size and description of each field is illustrated in Table 1 below:

TABLE 1

| FIELD | DESCRIPTION | SIZE |
| --- | --- | --- |
| CPCS-PDU PAYLOAD | Information to be transferred | 1 to $2^{16}$-1 octets |
| PAD | Cell padding or "filler" | 0 to 47 octets |
| CPCS-UU | CPCS User-to-User Indication | 1 octet |
| CPI | Common Part Indicator | 1 octet |
| Length | Length of CPCS-PDU (or SDU) | 2 octets |
| CRC | Cyclic Redundancy Check | 4 octets |

The CPCS-PDU payload field 302 is a variable-length field that includes the information payload to be transferred between layers. The PAD 304 is a variable-length field used to "fill" unused octet space so that the entire CPCS-PDU is an exact multiple of 48 so that the payload can be segmented into ATM cell payloads. The CPCS-PDU trailer field 306 includes various information and control fields. The Length field 312 indicates the length of the CPCS-PDU payload, and the CRC 314 detects errors in the CPCS-PDU 300. The field CPCS-UU 308 is conventionally defined for the transparent conveyance of user-to-user information between AAL users, and conventionally has no specific function in AAL5. The CPI field 310 is conventionally used to align the trailer to a 64-bit boundary. In alternative embodiments of the invention, the CPCS-UU 308 field or the CPI field 310 may modified in accordance with the principals of the present invention to provide the synchronization capabilities desired in AAL5. This is described more fully in connection with FIG. 4.

Figure 4:
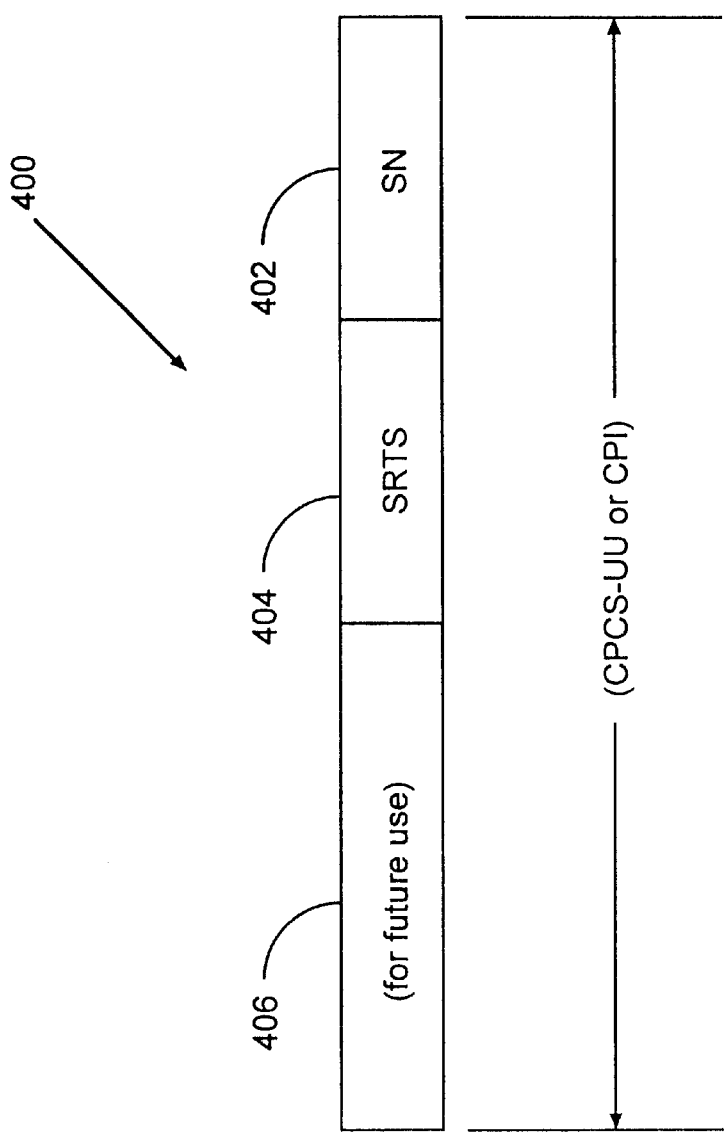
FIG. 4 illustrates one embodiment of an AAL5 synchronization management field in accordance with the present invention.

FIG. 4 illustrates one embodiment of an AAL5 synchronization management field 400 in accordance with the present invention. As previously indicated, bit locations required to realize synchronization in AAL5 may be obtained from the CPCS-UU 308 field or the CPI field 310 which were illustrated in FIG. 3. The AAL5 synchronization management field 400 is divided into at least two fields, including the SN (sequence number) field 402 and the SRTS (synchronous residual timestamp) field 404. Where an existing field is used, such as the CPCS-WU 308 field or the CPI field 310 from FIG. 3, extraneous bits may be available for future use as indicated by subfield 406. The size and description of each field is illustrated in Table 2 below:

TABLE 2

| FIELD | DESCRIPTION | SIZE |
| --- | --- | --- |
| CPCS-UU | CPCS User-to-User Indication | 8 bits |
| CPI | Common Part Indicator | 8 bits |
| SRTS | Synchronous Residual Timestamp | 2 bits |
| SN | Sequence Number | 2 bits |

Either the 8-bit CPCS-UU or the 8-bit CPI field can be used to provide the synchronous residual timestamp and the sequence number which together comprise 4 bits in one embodiment of the invention. In this embodiment, the SN field 402 includes a 2-bit sequence number having values between 0 and 3 (e.g., 00, 01, 10, 11). The two most significant bits (MSB) of a 4-bit SRTS are sent in the SRTS field 404 when the sequence number in the SN field 402 is equal to 0, and the two least significant bits (LSB) of the 4-bit SRTS are sent in the SRTS field 404 when the sequence number is equal to 1. SRTS bits are sent in a similar manner when the sequence numbers in the SN field 402 are 2 and 3. In this manner, an AAL5 protocol can be implemented while maintaining synchronization capabilities.

Figure 5:
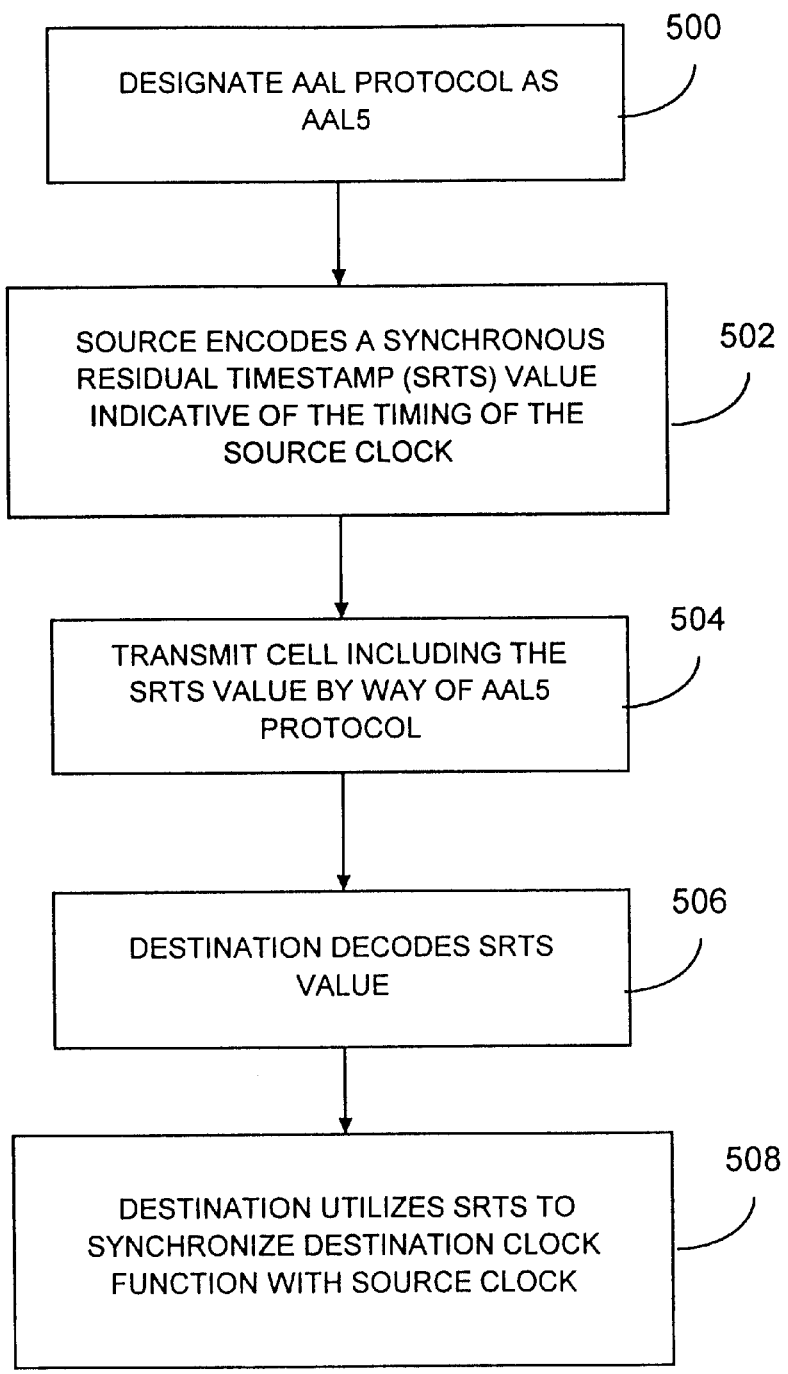
FIG. 5 is a flow diagram illustrating AAL5 synchronization in accordance with the present invention.

FIG. 5 is a flow diagram illustrating AAL5 synchronization in accordance with the present invention. An AAL5 protocol is designated 500, and an SRTS value indicative of the timing of the source clock is encoded 502. The cell is transmitted 504, including the SRTS value via the AAL5 protocol. The destination decodes 506 the SRTS value, and utilizes the SRTS to synchronize the destination clock function with the source clock, as seen at block 508. In one embodiment of the invention, the AAL5 Service Specific Convergence Sublayer (SSCS) manages clock recovery through the use of a phase locked loop.

Figure 6:
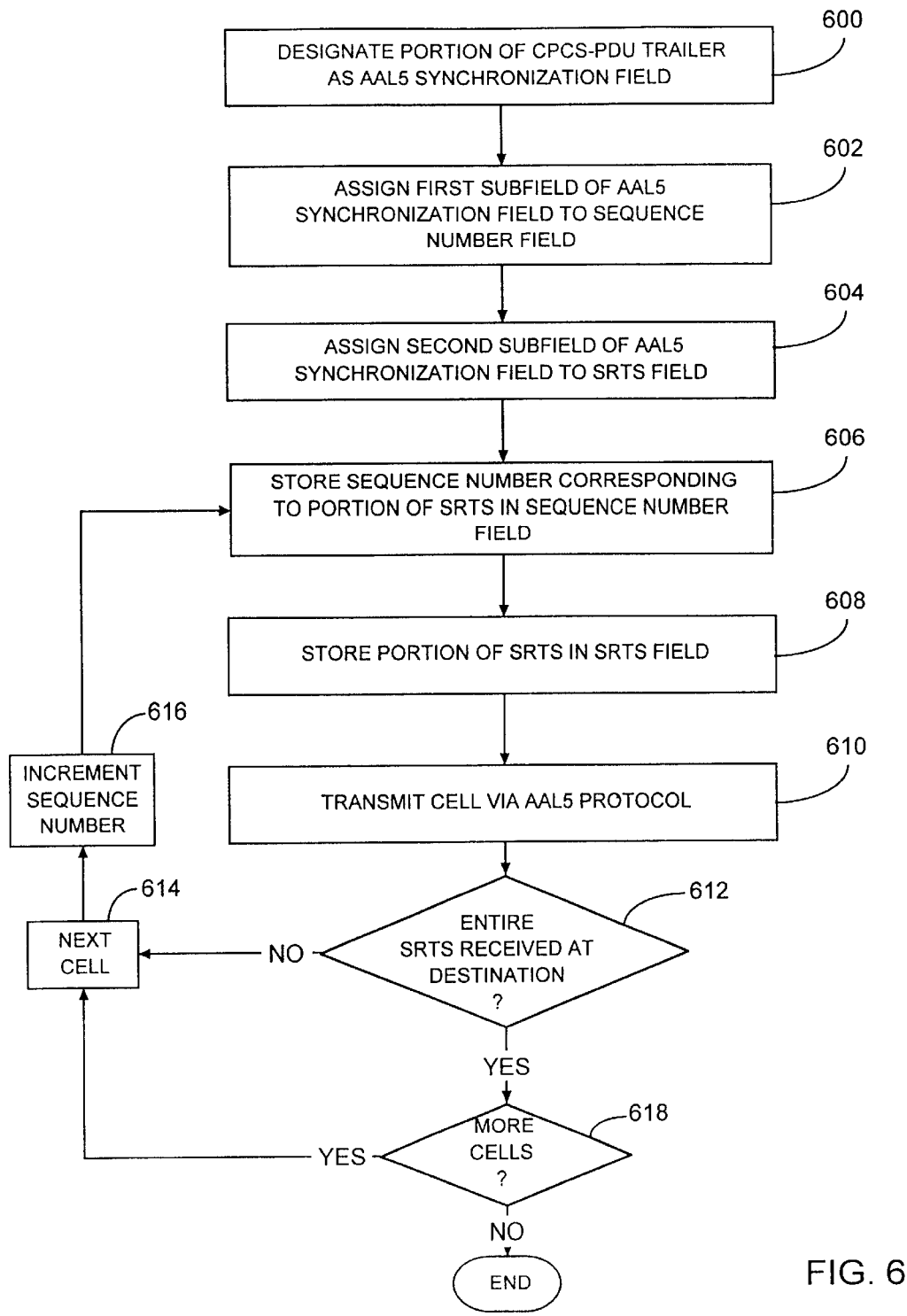
FIG. 6 is a flow diagram illustrating one manner in which SRTS values are transmitted in cells by way of the AAL5 protocol.

FIG. 6 is a flow diagram illustrating one manner in which SRTS values are transmitted in cells by way of the AAL5 protocol. A portion of the CPCS-PDU trailer is designated 600 as the AAL5 synchronization field. As previously indicated, the CPCS-UU field or the CPI field can be used for this purpose. A first subfield of the AAL5 synchronization field is assigned 602 as a sequence number field (SN), and a second subfield of the AAL5 synchronization field is assigned 604 as a synchronous residual timestamp (SRTS) field. A sequence number corresponding to a portion of the SRTS bits is stored 606 in the sequence number field, and the portion of the SRTS bits are stored 608 in the SRTS field. When the SN and SRTS fields and all remaining fields of the cell have been properly filled via the AAL5 protocol, the cell passes through the ATM and physical layers and is transmitted 610 to its destination.

Because the networking architecture described herein is a GSM architecture, and the bit rate of coded GSM speech is 16 Kbit/sec, the number of bits transmitted in time t is less than the 64 Kbit/sec of PCM by a factor of four. Therefore, while AAL1 provides for the measurement and transmission of an SRTS every eighth ATM cell, transmission of the SRTS in this environment will occur over the course of two ATM cell transmissions for GSM speech. Because only a portion (i.e., half) of the SRTS is transmitted with each cell, the sequence number identifies which portion of the SRTS has been transmitted. If it is determined 612 via the sequence number that the entire SRTS has not been received at the destination, the next cell 614 will provide the remaining portion of the SRTS. The sequence number is incremented 616, processing via the AAL5 protocol returns to step 606 to store the sequence number and SRTS portion 606, 608, and the next cell is transmitted 610.

In another embodiment of the present invention, an SRTS method is employed in connection with AAL5 by conveying a residual timestamp and sequence number in the payload field, with the actual payload, of the CPCS-PDU. The payload, in this example, represents a speech packet. The synchronization mechanism in this case is provided by the AAL5 user. This embodiment is described in connection with FIG. 7.

Figure 7:
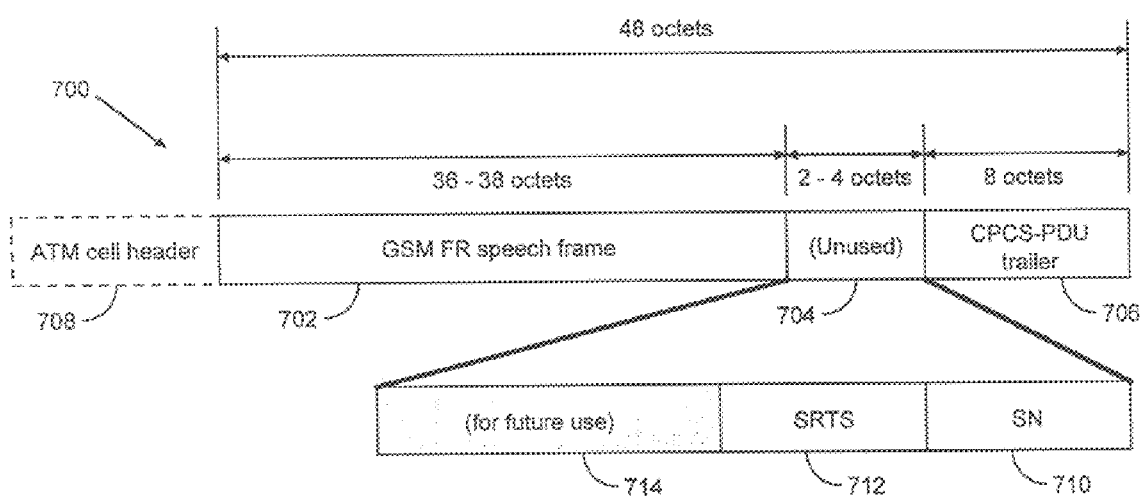
FIG. 7 illustrates an embodiment of an AAL5 synchronization management field in accordance with the present invention, where the residual timestamp and sequence number are transmitted in the payload field of the CPCS-PDU.

FIG. 7 illustrates an embodiment of an AAL5 synchronization management field in accordance with the present invention, where the residual timestamp and sequence number are transmitted in the payload field of the CPCS-PDU. FIG. 7 illustrates the situation where a GSM Full Rate (FR) speech frame is inserted into an ATM cell via AAL5. The GSM FR speech frame (i.e., TRAU frame) is originally 40 bits long, but at least two of the first bytes can be removed when using ATM because these first two to four bytes are conventionally defined for synchronization purposes in PCM. This results in two to four bytes that will can be reserved for ATM synchronization in accordance with the present invention.

Referring now to FIG. 7, the ATM cell 700 includes the GSM FR speech frame 702 and the CPCS-PDU trailer 706 within the 48-octet cell payload portion. Also within the ATM cell payload portion is field 704, which is illustrated as "unused" as a result of these bytes being conventionally defined for synchronization in PCM. The unused field 704 is used in the present invention to provide ATM synchronization management, as will be described in greater detail below. The ATM cell 700 also includes the ATM cell header 708.

Field 704, hereinafter referred to as the AAL5 synchronization management field (AAL5 SMF) 704, can be implemented similarly to the AAL5 synchronization management field 400 described in connection with FIG. 4. The AAL5 synchronization management field 700 is divided into at least two fields, including the SN (sequence number) field 710 and the SRTS (synchronous residual timestamp) field 712. Additional unused bits are reserved for future use, as indicated by subfield 714. The size and description of each field is illustrated in Table 3 below:

TABLE 3

| FIELD | DESCRIPTION | SIZE |
| --- | --- | --- |
| CPCS-PDU trailer | Control and Information Fields | 8 octets |
| GSM FR Speech Frame | GSM Speech Data | 36 to 38 octets |
| ATM Cell Header | Control Information Fields | 5 octets |
| AAL5 SMF | Synchronization Fields | 2 to 4 octets |
| SRTS | Synchronous Residual Timestamp | 2 bits |
| SN | Sequence Number | 2 bits |

In this embodiment, the SN field 710 includes a 2-bit sequence number having values between 0 and 3. The two MSBs of a 4-bit SRTS are sent in the SRTS field 712 when the sequence number in the SN field 710 is equal to 0, and the two LSBs of the 4-bit SRTS are sent in the SRTS field 712 when the sequence number is equal to 1. SRTS bits are sent in a similar manner when the sequence numbers in the SN field 710 are 2 and 3. In this case, the synchronization mechanism is provided by the AAL5 user.

The present invention can also be implemented using the AAL2 protocol. With respect to AAL2, the present invention employs a SRTS method in connection with AAL2, and conveys residual timestamp bits in the UUI bits of the Common Part Sublayer (CPS) packet. The synchronization mechanism is provided by AAL2 Service Specific Convergence Sublayer (SSCS). Alternatively, the present invention employs an SRTS method in connection with AAL2 by conveying a residual timestamp in the Common Part Sublayer Information (CPS-INFO) field with the actual payload. The payload in this case is a speech packet, and the synchronization mechanism is provided by the AAL2 user.

Figure 8:
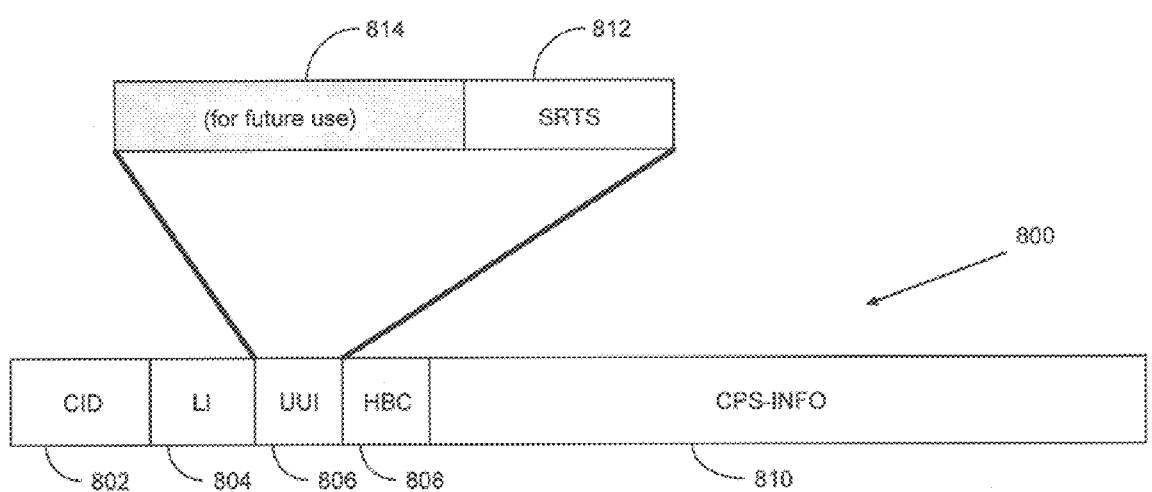
FIG. 8 represents an AAL2 CPS (Common Part Sublayer) packet format 800 as modified by the present invention.

AAL2 specifies generally ATM transport of connection-oriented and variable bit rate transfers. FIG. 8 represents an AAL2 CPS (Common Part Sublayer) packet format 800 as modified by the present invention. The CID field 802 is the Channel Identifier, the L1 field 804 is the Length Indicator, the UUI field 806 is the User-to-User Indication, the HEC field 808 is the Header Error Control field, and the CPS-INFO field 810 holds the information. The size and description of each field is illustrated in Table 4 below:

TABLE 4

| FIELD | DESCRIPTION | SIZE |
| --- | --- | --- |
| CID | Channel Identifier | 8 bits |
| LI | Length Identifier | 6 bits |
| UUI | User-to-User Indication | 5 bits |
| HEC | Header Error Control | 5 bits |
| CPS-INFO | Information | 1 to 45/64 bits |

The UII field 806 is used in the present invention to provide ATM synchronization management. The 5-bit UUI field conventionally provides for 32 codepoints, where codepoints 0–27 are available for SSCS entities, codepoints 30–31 are available to Layer Management, and codepoints 28–29 are reserved for future standardization. The present invention reserves codepoints 0–28 for synchronization use.

UUI field 806, hereinafter referred to as the AAL2 synchronization management field (AAL2 SMF) 806, can be implemented by providing an SRTS field 812. Because the CPS-INFO field already has one bit reserved as a sequence number field (SN), no additional SN field needs to be reserved as in the case of AAL5 synchronization management. Additional unused bits are reserved for future use, as indicated by subfield 814. The synchronization mechanism should be provided by the SSCS of AAL2 in this case.

An SRTS can also be implemented as described in connection with FIG. 7, but for the AAL2 protocol. The AAL2 payload (CPS-INFO) in this case corresponds to the 48-octet payload illustrated in FIG. 7. In this manner, the residual timestamp and sequence number will be transmitted in the payload field using the AAL2 protocol. In such case, the synchronization mechanism should be provided by the AAL2 user.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

We claim:

1. A method for synchronizing variable bit rate traffic between a source and destination in an Asynchronous Transfer Mode (ATM) network, comprising:

designating a variable bit rate ATM Adaptation Layer (AAL) protocol, AAL5, to define ATM cell traffic flow from the source to the destination;

encoding a synchronous residual timestamp (SRTS) value indicative of the timing of a source clocking function using one or more sequence numbers and one or more portions of the SRTS value;

creating an SRTS field in an AAL5 Common Part Convergence Sublayer Protocol Data Unit (CPCS-PDU) trailer to occupy at least a portion of the SRTS value;

creating a sequence number (SN) field in the AAL5 CPCS-PDU trailer to occupy a sequence number corresponding to a sequence and completion status of segmented portions of the SRTS value;

transmitting the CPCS-PDU, including the sequence number and the segmented portion of the SRTS value from the CPCS-PDU trailer, using the AAL5 protocol;

receiving the ATM cells and corresponding SRTS values at the destination;

decoding the SRTS value for use at the destination; and synchronizing a destination clocking function with the source clocking function by modifying the destination clocking function according to the SRTS values.

2. The method as in claim 1, wherein creating an SRTS field in the AAL5 CPCS-PDU trailer comprises creating the SRTS field in the CPCS User-to-User (CPCS-UU) field of the CPCS-PDU trailer.

3. The method as in claim 1, wherein creating an SRTS field in the AAL5 CPCS-PDU trailer comprises creating the SRTS field in the Common Part Indicator (CPI) field of the CPCS-PDU trailer.

4. The method as in claim 1, wherein creating an SN field in the AAL5 CPCS-PDU trailer comprises creating the SN field in the CPCS User-to-User (CPCS-UU) field of the CPCS-PDU trailer.

5. The method as in claim 1, wherein creating an SN field in the AAL5 CPCS-PDU trailer comprises creating the SN field in the Common Part Indicator (CPI) field of the CPCS-PDU trailer.

6. The method as in claim 1, further comprising:

determining whether the end of the SRTS value has been received at the destination based on the sequence number; and incrementing the sequence number in a subsequent ATM cell and providing an additional segmented portion of the SRTS value when the end of the SRTS value has not been received at the destination.

7. The method as in claim 1, wherein transmitting the SRTS values with the ATM cells using AAL5 comprises:

creating an SRTS field in an ATM payload section of the AAL5 Common Part Convergence Sublayer Protocol Data Unit (CPCS-PDU) to occupy at least a portion of the SRTS value;

creating a sequence number (SN) field in the ATM payload section of the AAL5 CPCS-PDU to occupy a sequence number corresponding to a sequence and completion status of segmented portions of the SRTS value;

transmitting the CPCS-PDU, including the sequence number and the segmented portion of the SRTS value from the ATM payload section, using the AAL5 protocol.

8. The method as in claim 7, wherein creating an SRTS field and creating an SN field in the ATM payload section comprises creating the SRTS field and the SN field in the PCM synchronization field of the CPCS-PDU.

9. The method as in claim 1, wherein:

designating a variable bit rate AAL protocol comprises designating AAL2 to define the ATM cell traffic flow from the source to the destination; and transmitting the SRTS values comprises transmitting the SRTS values with the ATM cells using AAL2.

10. The method as in claim 9, wherein transmitting the SRTS values with the ATM cells using AAL2 comprises:

creating an SRTS field in an AAL2 Common Part Sublayer (CPS) packet to occupy at least a portion of the SRTS value;

utilizing a sequence number (SN) field in the AAL2 CPS packet to occupy a sequence number corresponding to a sequence and completion status of segmented portions of the SRTS value;

transmitting the CPS packet, including the sequence number and the segmented portion of the SRTS value from the CPS packet, using the AAL2 protocol.

11. The method as in claim 10, wherein creating an SRTS field in the AAL2 CPS packet comprises creating the SRTS field in the User-to-User Indication (UUI) field of the CPS packet.

12. The method as in claim 10, wherein utilizing the SN field in the AAL2 CPS comprises utilizing the SN field in the CPS-INFO field of the AAL2 CPS.

13. The method as in claim 10, further comprising:

determining whether the end of the SRTS value has been received at the destination based on the sequence number; and incrementing the sequence number in a subsequent ATM cell and providing an additional segmented portion of the SRTS value when the end of the SRTS value has not been received at the destination.

14. The method as in claim 9, wherein transmitting the SRTS values with the ATM cells using AAL2 comprises:

creating an SRTS field in an ATM payload section of the AAL2 Common Part Sublayer (CPS) packet to occupy at least a portion of the SRTS value;

creating a sequence number (SN) field in the ATM payload section of the AAL2 CPS packet to occupy a sequence number corresponding to a sequence and completion status of segmented portions of the SRTS value;

transmitting the CPS packet, including the sequence number and the segmented portion of the SRTS value from the ATM payload section, using the AAL2 protocol.

15. A cellular communications system for communicating voice information over a core network using Asynchronous Transfer Mode (ATM) technology and variable bit rates (VBR), the system comprising:

at least one a base transceiver station (BTS) to communicate with at least one mobile station (MS), the BTS having a first ATM interface coupled to the core network;

an Inter Working Function (IWF) having a second ATM interface coupled to the core network to communicate with the first ATM interface in the BTS via the core network;

processing means for synchronizing variable bit rate traffic between the first and second ATM interfaces, the synchronization means comprising:

means for designating a variable bit rate ATM Adaptation Layer (AAL) protocol to define ATM cell traffic flow between the first and second ATM interfaces;

means for encoding a synchronous residual timestamp (SRTS) value indicative of the timing of a source clocking function using one or more sequence numbers and one or more portions of the SRTS value;

means for creating an SRTS field in an AAL5 Common Part Convergence Sublayer Protocol Data Unit (CPCS-PDU) trailer to occupy at least a portion of the SRTS value;

means for creating a sequence number (SN) field in the AAL5 CPCS-PDU trailer to occupy a sequence number corresponding to a sequence and completion status of segmented portions of the SRTS value;

means for transmitting the CPCS-PDU, including the sequence number and the segmented portion of the SRTS value from the CPCS-PDU trailer, using the AAL5 protocol;

means for receiving the ATM cells and corresponding SRTS values at a destination ATM interface; and means for synchronizing a destination clocking function with the source clocking function by modifying the destination clocking function according to the SRTS values.

* * * * *